UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

BLUE SUBSTANTIVE DYE.

SPECIFICATION forming part of Letters Patent No. 498,759, dated June 6, 1893.

Application filed January 19, 1893. Serial No. 458,991. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, LVIII, 100, and XXV, 29,631.

*To all whom it may concern:*

Be it known that we, JOHANN BAMMANN and MORITZ ULRICH, doctors of philosophy, chemists, and assignors to the FARBENFABRIKEN, VORMALS FR. BAYER & CO., of Elberfeld, subjects of the Emperor of Germany, residing at Elberfeld, Germany, have invented a new and useful Improvement in the Manufacture of Blue Substantive Dye-Stuffs, (for which the aforesaid FARBENFABRIKEN have already obtained Letters Patent in the following countries: England, No. 13,443, dated August 26, 1890; France, No. 210,033, dated December 6, 1890; Italy, XXV, No. 29,631, and LVIII, No. 100, dated April 27, 1891; Austria-Hungary, No. 35,494 and No. 58,417, dated November 28, 1890,) of which the following is a specification.

Our invention relates to the production of a new blue mixed substantive dye-stuff by combining in equimolecular proportions a tetrazo ortho ditolyl salt with amidonaphthol disulpho acid and with 2:6 dihydroxynaphthalene.

By amidonaphthol disulpho acid we understand that alphaamido alphanaphtholbeta disulpho acid which is described in a separate specification and was first produced by us by melting with caustic alkalies most practically at a temperature from about 180° to 190° centigrade the alphanaphthylamine trisulpho acid which is derived from the naphthalene trisulpho acid of Gürke and Rudolph and was first prepared by nitrating the said naphthalene trisulpho acid and reducing the so formed alphamononitronaphthalene trisulpho acid. This amidonaphthol disulpho acid, usually termed 1:8 amidonaphtholbeta disulpho acid, is identical with the amidonaphthol disulpho acid H which has been obtained afterward by converting naphthalene 2:7 disulpho acid into its dinitro compound, reducing the latter and heating the so formed diamidonaphthalene disulpho acid with diluted acids as mentioned in the specification forming part of Letters Patent to Meinhard Hoffmann, No. 464,135, dated December 1, 1891.

In carrying out our process practically we proceed as follows: 2.12 kilos, by weight, of orthotolidine or the corresponding quantity of a salt thereof are converted in hydrochloric solution by means of 1.4 kilos, by weight, of sodium nitrite into tetrazo ortho ditolylchloride. A solution in water of 3.63 kilos, by weight, of the sodium salt of the above specified 1:8 amidonaphthol beta disulpho acid is then allowed to flow into the above tetrazo solution, keeping the resulting solution either moderately alkaline by adding for instance sodium carbonate or rendering the same weakly acid by means of acetic acid. When after some hours the formation of the intermediate product is complete, the latter is separated by means of common salt, filtered off and introduced into an acetic acid mixture obtained by mixing three kilos, by weight, of sodium acetate, 1.6 kilos, by weight, of 2:6 dihydroxynapthalene with acetic acid. However it is not necessary to filter off previously the first formed intermediate product, but the above weakly alkaline or acetic solution containing the intermediate product from one molecular proportion of tetrazo ortho ditolyl chloride and one molecular proportion of 1:8 amidonaphthol beta disulpho acid can directly be added to the acetic solution of the said dihydroxynaphthalene. The resulting mixture is kept moderately acid by means of acetic acid, and after some hours the reaction is completed by heating at about 60° centigrade. After rendering alkaline, for instance, by means of sodium carbonate, the dye-stuff is isolated in the usual manner viz., by salting out, filtering off, pressing and drying. In the same manner as the sodium salt of the specified amidonaphtholdisulpho acid also the corresponding quantity of another alkaline salt thereof or of the free acid can be employed.

Our new dye-stuff having the formula:

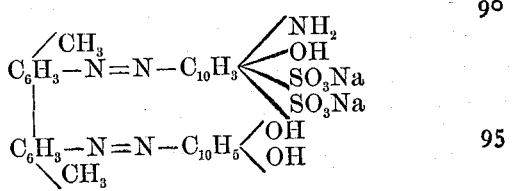

forms after drying and pulverizing a grayish-black powder soluble in water with violet color, somewhat soluble in alcohol with blue color. It dissolves in ammonia with pure blue color. In sodium carbonate it is little soluble at ordinary temperature with violet color, more easily on heating with dark blue color. It sparingly dissolves in soda-lye with violet color at ordinary temperature, more readily on heating with from dark violet to bluish-red color. It is insoluble in diluted hydrochloric and sulphuric acid. On adding to its watery solutions ammonia the color becomes pure blue, while an excess of the reagent renders the liquid dull. When sodium carbonate is added to its watery solutions, the color turns into reddish-blue, and after some time the liquid becomes dull. The color of its solutions in water becomes pure blue, if a small quantity of soda-lye is added, while it turns into reddish-blue, if an excess of soda-lye is added, dark reddish-blue flakes being gradually separated. By mixing its watery solutions with small quantities of hydrochloric or sulphuric acid the color thereof is not changed, while an excess of these acids renders the color somewhat bluer and effects after some time the separation of dark blue flakes. It dissolves in concentrated sulphuric acid with greenish-blue color, which on adding ice water turns into reddish-blue, while a fine dark blue precipitate is gradually separated. It produces on unmordanted cotton blue shades. When the fiber dyed with our new product is placed in a moderately acid solution of sodium nitrite and subsequently in a weakly alkaline bath of betanaphthol deeper blue or bluish-black shades result.

The new product is different by its composition from the three dye-stuffs which we have described in three separate specifications, Serial Nos. 458,992, 458,993 and 459,086, and of which the one is formed from tetrazoditolyl salt, 1:8 amidonaphthol beta disulpho acid and alpha naphthol alpha monosulpho acid, while the other results from tetrazodiphenyl salt, 1:8 amidonaphthol beta disulpho acid and alpha naphthol alpha monosulpho acid (1:4) and the third product is formed from equimolecular proportions of tetrazodiphenyl salt, 1:8 amidonaphthol beta disulpho acid and alphanaphthylamine. It differs also by its composition from the two products described in our two applications filed December 18, 1891, Serial Nos. 415,515 and 415,516, and resulting from the combination of one molecular proportion of tetrazodiphenyl or tetrazoditolyl salt with two molecular proportions of 1:8 amidonaphthol beta disulpho acid.

Having thus described the nature of this invention and in what manner the same is to be carried out, we declare what we claim as new, and desire to secure by Letters Patent, is—

1. The process of producing a new blue substantive dye-stuff from equal molecular proportions of orthotolidine, 1:8—amidonaphthol beta disulpho acid and 2:6—dihydroxynaphthalene, which process consists in the combination of one molecular proportion of tetrazo ortho ditolyl salt with one molecular proportion of 1:8—amidonaphthol beta disulpho acid or an alkaline salt thereof and with one molecular proportion of dihydroxynaphthalene.

2. As a new product the dye-stuff having the formula:

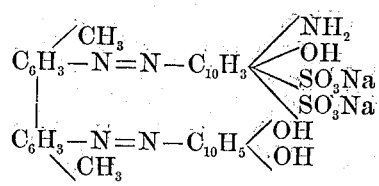

forming a grayish-black powder, soluble in water with violet color, slightly soluble in alcohol with blue color, soluble in ammonia with pure blue color, little soluble at ordinary temperature in sodium carbonate with violet, more easily on heating with dark blue color, sparingly soluble in soda-lye at ordinary temperature with violet, more readily on heating with dark violet to bluish red color, soluble in concentrated sulfuric acid with greenish-blue color, which on dilution with ice-water turns reddish blue, while a fine dark blue precipitate is gradually separated, insoluble in dilute hydrochloric and sulfuric acid; dyeing unmordanted cotton blue, which, after treatment with nitrous acid and combination with an alkaline solution of beta naphthol changes into deeper blue or blue black, and having the qualities substantially as specified.

In testimony whereof we have signed our names in the presence of two subscribing witnesses.

JOHANN BAMMANN.
MORITZ ULRICH.

Witnesses:
WM. ESSENWEIN,
RUDOLPH FRICKE.